United States Patent [19]
DiVita

[11] 4,280,751
[45] Jul. 28, 1981

[54] TWO-WAY COUPLER FOR BRANCHED LIGHT-TRANSMISSION NETWORK

[75] Inventor: Pietro DiVita, Turin, Italy

[73] Assignee: CSELT - Centro Studi e Laboratori Telecomunicazioni S.p.A., Turin, Italy

[21] Appl. No.: 33,009

[22] Filed: Apr. 24, 1979

[30] Foreign Application Priority Data

Apr. 26, 1978 [IT] Italy .................... 67932 A/78

[51] Int. Cl.$^3$ .............................................. G02B 5/14
[52] U.S. Cl. ............................. 350/96.15; 350/96.18
[58] Field of Search ............... 350/96.15, 96.16, 96.18, 350/96.19

[56] References Cited

U.S. PATENT DOCUMENTS

| | | | |
|---|---|---|---|
| 3,453,036 | 7/1969 | Swope et al. ................. | 350/96.16 |
| 3,901,582 | 8/1975 | Milton ........................... | 350/96.19 |
| 4,021,099 | 5/1977 | Kawasaki et al. ............. | 350/96.18 |
| 4,078,852 | 3/1978 | Lebduska ...................... | 350/96.19 |

OTHER PUBLICATIONS

Lean, "Taps for Multimode Fibers", IBM Tech. Disc. Bull., vol. 21, No. 4, Sep. 1978.

*Primary Examiner*—Stewart J. Levy
*Attorney, Agent, or Firm*—Karl F. Ross

[57] ABSTRACT

A branched light-transmission network includes at least one body with a plurality of light-reflecting surfaces meeting in a common point or edge for illumination by a primary light guide, such as a light-conducting filament or foil, emitting a beam which is split among these surfaces into several components directed toward respective secondary light guides. Each reflecting surface is part of an optical system forming two conjugate points respectively coinciding with the centers of the proximal ends of the primary and secondary light guides emitting and collecting the rays reflected by that surface. These conjugate points may be the foci of an ellipse partly defined by the intersection of the reflecting surface with the common axial plane of the associated light guides; alternatively, they are the focal points of two lenses of positive refractivity which define paths of parallel light rays impinging upon and departing from the flat reflecting surface. The arrangement may be inverted to let the secondary light guides illuminate the associated reflecting surfaces for producing a composite beam in the primary light guide.

10 Claims, 6 Drawing Figures

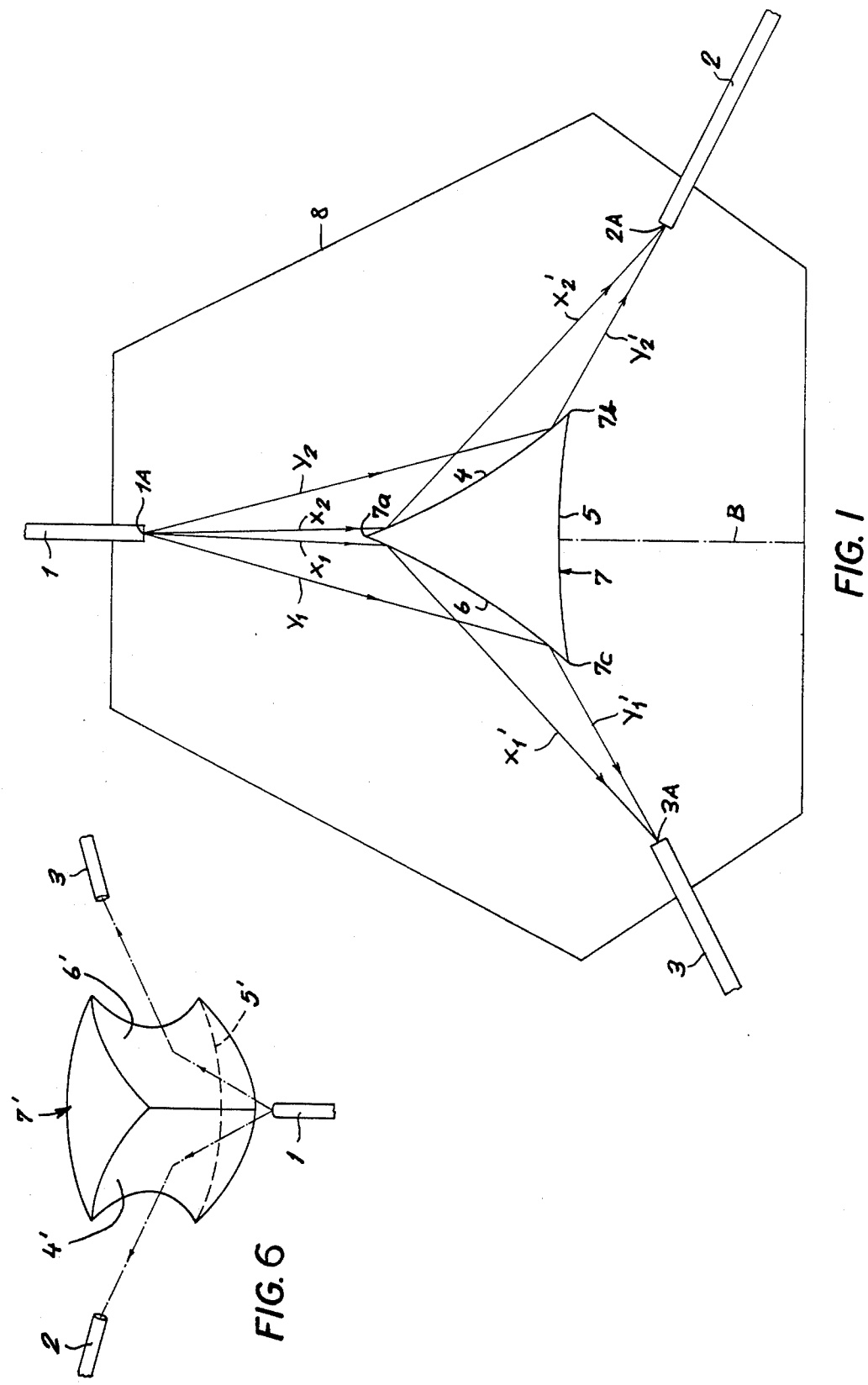

4,280,751

TWO-WAY COUPLER FOR BRANCHED LIGHT-TRANSMISSION NETWORK

FIELD OF THE INVENTION

My present invention relates to optical signaling and, more particularly, to a branched light-transmission network designed to distribute information-bearing luminous energy from a given source among several receivers or, conversely, to combine distinctly modulated contributing beams from different sources into a composite beam.

BACKGROUND OF THE INVENTION

The splitting of an incoming modulated light beam into two outgoing beams is conventionally achieved by joining a primary light guide, carrying the incoming beam, to a pair of secondary light guides designed to convey respective portions of the luminous energy to their destinations. The extremities of the secondary light guides confronting the primary light guide must be suitably reduced for proper splicing. The resulting structure is generally Y-shaped, with the arms of the Y diverging at a small angle from each other on account of the transmission characteristics of a light guide which enable propagation of light rays only within a narrow field bounded by limiting ray paths including a predetermined critical angle with the guide axis. At such a junction, therefore, splitting of the beam energy between two branches is possible only in the direction from the primary to the secondary guides since any beam incoming through one of the arms of the Y could not be divided between the other arm and the stem thereof.

The use of semitransparent reflectors for beam-splitting purposes is also known but generally entails significant losses of luminous energy, especially when such a beam splitter is to be utilized for combining two contributing beams into a composite beam.

OBJECTS OF THE INVENTION

An important object of my present invention, therefore, is to provide a two-way light coupler enabling either the splitting of a primary beam into several secondary beams or the combination of several contributing beams into a composite beam with minimum losses.

Another object is to provide a coupler of this description which allows any one of several optically interconnected light guides to serve as a source of luminous energy to be distributed among all the other light guides associated therewith.

SUMMARY OF THE INVENTION

A coupler according to my present invention serves three or more light guides with terminal portions whose axes may or may not be coplanar and whose end faces confront a common region; each guide axis intersects the axes of the other light guides, though not necessarily in a common point. The coupler comprises a central body in the aforementioned common region, this body having a plurality of reflecting surfaces each terminating near the axes of an associated pair of light guides and being part of an optical focusing system with two conjugate points respectively coinciding with the centers of the end faces of the associated guide pair. Thanks to this focusing system, light rays originating at one of these centers are reflected toward the other center so as to be collected by the corresponding guide. Each of these light guides has ray paths extending from the center of its end face to at least two of the reflecting surfaces of the central body so that luminous energy emitted by any guide is distributed, in equal parts or in some other chosen proportion and without passing through that body, among other guides associated in the aforedescribed way with those reflecting surfaces.

The term "light guide" encompasses both light-conducting filaments or fibers and light-conducting foils or flat fiber bundles, as discussed in my prior U.S. Pat. No. 4,134,639.

In order to establish the aforementioned conjugate points, the reflecting surfaces may be elliptically curved along a line of intersection with the common axial plane of the associated guide pair whose end faces then have centers which coincide with the foci of the ellipse constituting the aforementioned conjugate points. Especially if the light guides are flat and coplanar, each reflecting surface may be elliptically cylindrical with generatrices perpendicular to the axial plane. Alternatively, and particularly in the case of filamentary light guides, each reflecting surface advantageously forms a segment of an ellipsoid of revolution whose axis passes through the centers of the end faces of the associated guide pair.

According to another embodiment, the reflecting surfaces are flat and the optical focusing system including any of these surfaces further comprises a pair of positively refracting lenses having focal points coincident with the centers of the end faces of the associated guide pair so that each reflecting surface lies in a field of parallel rays impinging thereon through one lens and departing therefrom through the other lens. Such two-lens systems with flat reflecting surfaces are the optical equivalent of the above-discussed elliptically curved reflecting surfaces. In the case of flat and coplanar light conductors, the lenses may be cylindrical with generatrices perpendicular to the axial plane, similarly to the aforedescribed elliptically cylindrical reflecting surfaces.

A completely reciprocal coupler according to my invention, allowing each light guide to distribute luminous energy among all the other guides or to collect such energy from them, may be designed for either three or four light guides as more fully described hereinafter. If such a coupler is used for generating a composite beam in one guide from contributing beams emitted by other guides, a light barrier may have to be interposed between any two of these other guides for preventing an undesired exchange of luminous energy among them.

In all instances, loss of luminous energy through internal reflection at the guide ends can be avoided by enveloping the central body as well as the adjacent extremities of the light guides in a mass of transparent material whose refractive index substantially matches that of the guides, as known per se from my above-identified prior patent, for example.

BRIEF DESCRIPTION OF THE DRAWING

The above and other features of my invention will now be described in detail with reference to the accompanying drawing in which:

FIG. 1 is a diagrammatic cross-sectional view of a first embodiment of my invention with three coplanar light guides symmetrically disposed about a central coupler body having elliptically curved reflecting surfaces;

FIG. 6 is a perspective view of the light guides of FIG. 1 coacting with a modified central body.

SPECIFIC DESCRIPTION

Figure 3:
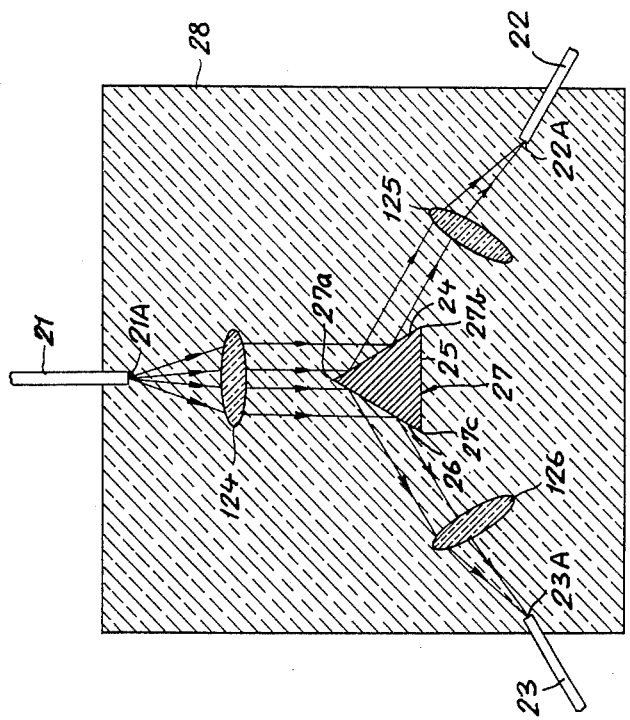
FIG. 3 is another view similar to FIG. 1, showing a modified coupler with collective lenses surrounding a flat-surfaced central body.

In FIG. 1 I have shown a coupler according to my invention comprising a reflecting body 7 of generally triangular cross-section centrally disposed between three light guides 1, 2 and 3 spaced 120° apart, the axis of each light guide being in line with a respective corner 7a, 7b, 7c of body 7 which therefore define the vertices of an equilateral triangle. Within the common plane of these axes, the three sides 4, 5 and 6 of the body form arcs of respective ellipses whose foci coincide with the centers 1A, 2A and 3A of the confronting end faces of the three light guides. The assembly of FIG. 1, i.e. the central body 7 and the extremities of the several light guides, is enveloped in a mass 8 of solid transparent material whose refractive index corresponds to that of the guide cores.

More particularly, surface 4 forms part of an ellipse whose foci are the points 1A and 2A; surface 5 forms part of an ellipse whose foci are the points 2A and 3A; and surface 6 forms part of an ellipse whose foci are the points 3A and 1A. Thus, all the rays emitted from guide 1 within the common axial plane of the several light guides and impinging upon surfaces 4 and 6 will be reflected toward guides 2 and 3 and will arrive at or near their center points 2A and 3A. If the curvature of these surfaces 4 and 6 corresponds to that of two ellipsoids of revolution respectively centered on lines 1A–2A and 1A–3A, this will apply also to rays deviating from the axial plane; such a reflecting body, with surfaces 4', 5' and 6', has been illustrated at 7' in FIG. 6. The structure of FIG. 1, however, applies also to cylindrical curvatures and its operation will be discussed only in connection with rays lying in the axial plane.

In this instance it is assumed that guide 1 is illuminated at its far end by a nonillustrated light source modulated by message signals which are to be transmitted to respective receivers confronting the far ends of the other two guides. Thus, I have shown a pair of paraxial rays $x_1$, $x_2$ and a pair of limiting rays $y_1$, $y_2$ all leaving the guide 1 at its center 1A, the rays $x_1$, $y_1$ being reflected by surface 6 so that their extensions $x'_1$, $y'_1$ converge at the center 3A of guide 3 whereas the rays $x_2$ and $y_2$ are reflected at surface 4, their extensions $x'_2$, $y'_2$ converging at the center 2A of guide 2. With the symmetrical arrangement shown, the beam emitted by the primary guide 1 is split evenly among the two secondary guides 2 and 3. It will also be apparent that a beam arriving via guide 2 would be evenly split by surfaces 4 and 5 between guides 1 and 3 and that in like manner a beam coming in through guide 3 would be divided by surfaces 5 and 6 between guides 2 and 1.

The coupler shown in FIG. 1 can also be used to combine two contributing beams, emitted by guides 2 and 3, into a composite beam conveyed by guide 1 to a remote destination. In that instance, however, a light barrier B (schematically indicated in phantom lines) is advantageously inserted in matrix 8 between guides 2 and 3 to prevent undesirable illumination of either of them by the other.

The cross-section of reflecting body 7 is so chosen that its surfaces 4 and 6 together intercept all the light rays emanating from guide 1 within the field bounded by the limiting ray paths $y_1$ and $y_2$. Thus, all the luminous energy radiated within the axial plane of the guides is transmitted from primary guide 1 to secondary guides 2 and 3. With ellipsoidally curved reflecting surfaces 4' and 6' as shown in FIG. 6, practically no loss occurs between the transmitting and receiving light guides as long as the height of body 7' is sufficient for interception of the limiting rays in planes perpendicular to the common axial plane.

It will be noted that the positions of the paraxial and limiting rays such as $x_1$, $y_1$ is interchanged upon reflection so that their extensions $x'_1$, $y'_1$ enter the outgoing guide at the critical angle and at a near-zero angle of incidence, respectively. This transposition tends to equalize the lengths of the ray paths if the primary guide 1 and the secondary guides 2, 3 are of similar length. In any event, the light guides may have a graded refractive index, varying radially according to a parabolic law as described in my above-identified prior U.S. Pat. No. 4,134,639, for further equalization. In that case, of course, the refractive index of matrix 8 will match that of the guides only at some points.

Figure 2:
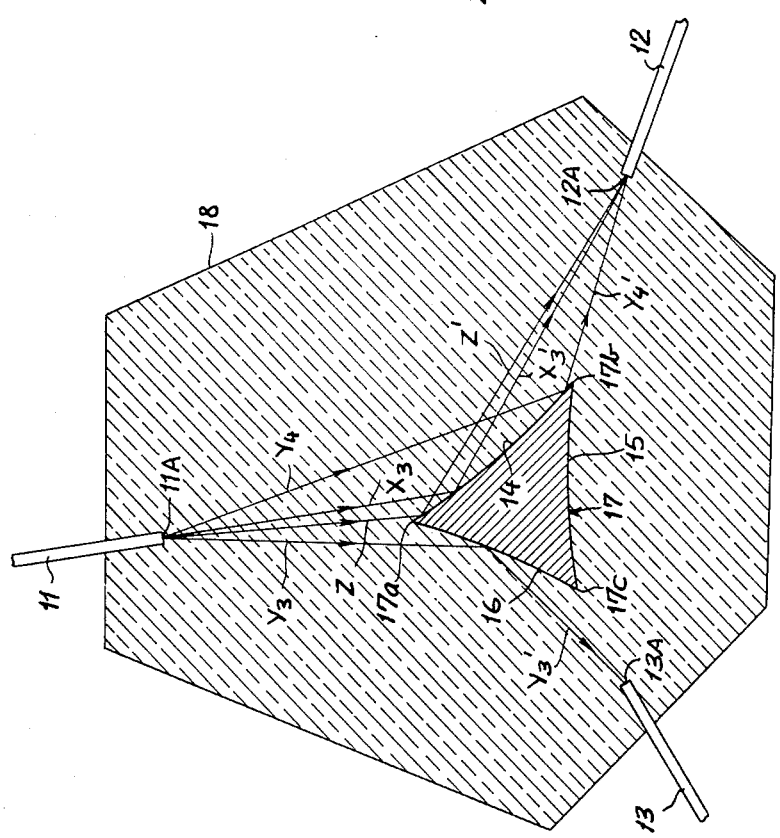
FIG. 2 is a view similar to FIG. 1 but showing an asymmetrical disposition of the three light guides.

In certain instances it may be desirable to divide the luminous energy of an incoming beam in a proportion other than 1:1 among the outgoing guides. Thus, as shown in FIG. 2, a central body 17 with reflecting surfaces 14, 15 and 16 may be asymmetrically disposed between associated light guides 11, 12 and 13 having confronting end faces with centers 11A, 12A and 13A. The guide axes in FIG. 2 are still coplanar but, at least in the case of guides 11 and 12, are no longer aligned with the corresponding corners 17a and 17b of reflector 17. The triangle defined by corners 17a, 17b and 17c is not equilateral. The assembly is again embedded in a transparent matrix 18 of matching refractive index.

To illustrate the distribution of luminous energy from primary guide 11 between secondary guides 12 and 13, I have shown a central ray $x_3$ passing along the axis of guide 11, two limiting rays $y_3$ and $y_4$ on opposite sides of that axis, and an intermediate ray $z$ between rays $x_3$ and $y_3$. Rays $z$, $x_3$ and $y_4$ all impinge upon reflecting surface 14 so that their extensions $z'$, $x'_3$ and $y'_4$ converge on the center 12A of guide 12; ray $y_3$, alone among those particularly illustrated, strikes the surface 16 so that its extension $y'_3$ reaches the center 13A at the entrance end of guide 13. Thus, the major part of the luminous energy emitted by guide 11 goes to guide 12 while the balance is collected by guide 13. Similar deviations take place in the case of an incoming beam emitted either by light guide 12 or by light guide 13.

As will be readily apparent, the proportions of the distributed light energy can be varied by a change in the configuration of reflector 17 and/or in the relative positions of that reflector and the associated light guides.

In FIG. 3 I have shown a modified central body 27 with flat reflecting surfaces 24, 25 and 26 whose corners 27a, 27b, 27c are the vertices of an equilateral triangle similar to that of FIG. 1. Three positive lenses 124, 125, 126 are interposed between these vertices and the confronting ends of light guides 21, 22 and 23, respectively. The focal length of the lenses is so chosen, with regard to the refractive index of the surrounding medium constituted by a surrounding matrix 28, that each lens has a focal point coinciding with the center 21A, 22A, 23A of the confronting guide end. Thus, an incoming beam emitted by guide 21 is defocused by lens 124 into a field of parallel rays which strike the two body surfaces 24 and 26 where they are reflected, still parallel, toward lenses 125 and 126 for refocusing upon guides 22 and 23, respectively. Each lens is large enough to span the limiting ray paths of the associated light guide in order to direct as many rays as possible of the incoming beam onto the prismatic reflector 27 for distribution to the two other guides. If the lenses are spherical rather than cylindrical, this applies also to rays deviating from the common axial plane of the guides and results in a virtually loss-free transmission of luminous energy.

Naturally, lenses such as those shown in FIG. 3 can also be used with asymmetrical arrays like the one of FIG. 2.

Figure 4:
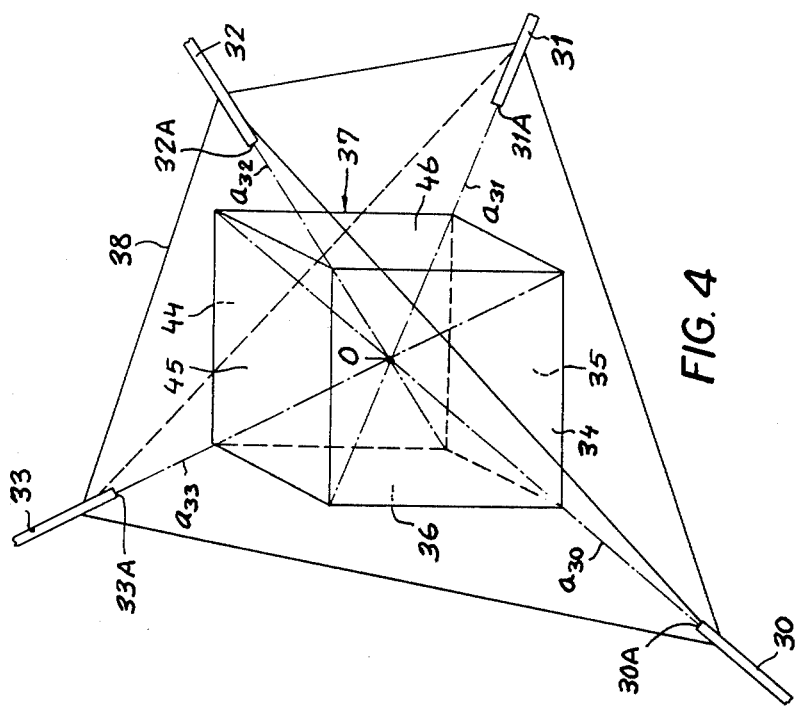
FIG. 4 is a perspective view of a three-dimensional array of four light guides surrounding a cube-shaped central body.

FIG. 4 illustrates a three-dimensional array with four light guides 30, 31, 32, 33 whose axes $a_{30}$, $a_{31}$, $a_{32}$, $a_{33}$ are trained upon nonadjacent corners of a central body 37 in the form of a cube, each guide axis being aligned with a respective diagonal of that body so that all meet in a common point 0. Cube 37 has six faces 34, 35, 36 and 44, 45, 46 which are ellipsoidally concave, each ellipsoid having as its foci two of the end points 30A, 31A, 32A, 33A of light guides 30-33. The assembly is embedded in a refractivity-matching matrix 38.

As will be apparent, a beam emitted by light guide 30 is evenly split among the three confronting cube faces 34, 35, 36 respectively reflecting its rays toward the other three guides 31, 32 and 33. In an analogous manner, a beam emitted by guide 31 will be reflected by faces 35, 44 and 46 onto guides 30, 33 and 32, a beam emitted by guide 32 will be reflected by faces 34, 45 and 46 onto guides 30, 33 and 31, and a beam emitted by guide 33 will be reflected by faces 36, 44 and 45 onto guides 30, 31 and 32. The symmetrical arrangement of FIG. 4 could, of course, be replaced by an asymmetrical one; also, the surfaces of the cube 37 could be flat if four spherical lenses similar to those shown in FIG. 3 were inserted between the several guide ends and corresponding corners of that cube.

Figure 5:
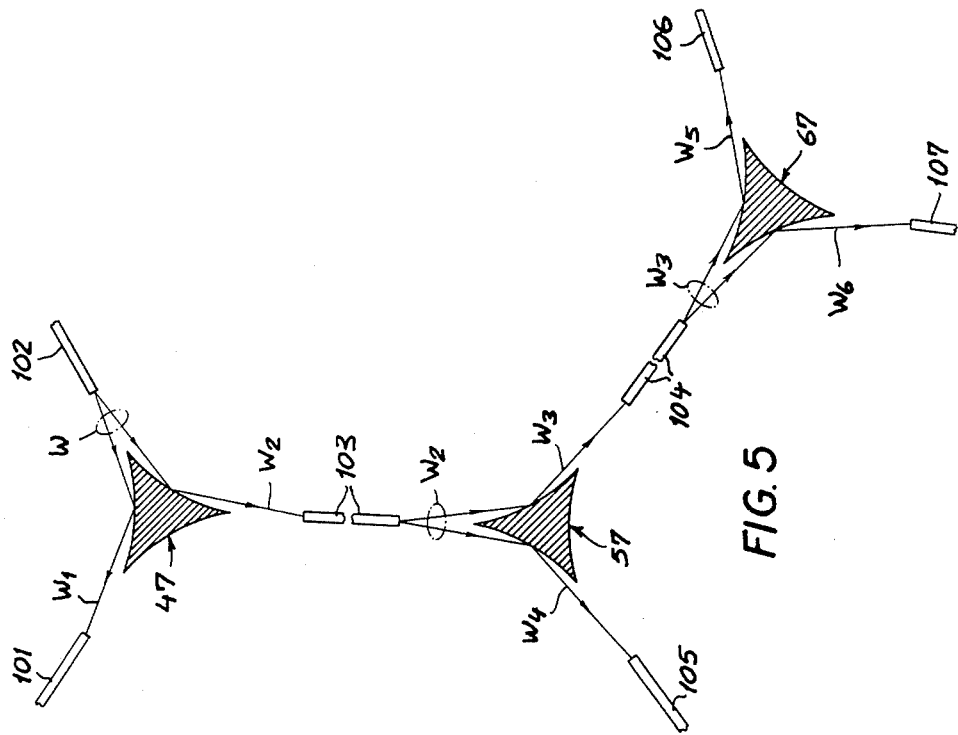
FIG. 5 shows diagrammatically the layout of a light-transmission network comprising several cascaded couplers according to my invention.

In FIG. 5 I have illustrated part of an extended light-transmission network with a multiplicity of guides 101-107 and three cascaded reflectors 47, 57, 67 each similar to reflector 7 of FIG. 1. With light guide 102 acting as a feeder, a primary beam w emitted by it is split by reflector 47 into two secondary beams $w_1$ and $w_2$ reaching guides 101 and 103, respectively. Guide 103, acting both as a collector and as an emitter of luminous energy, directs the beam $w_2$ onto an edge of reflector 57 which splits it into two ternary beams $w_3$ and $w_4$, the latter being collected by guide 105 whereas beam $w_3$ is conveyed by guide 104 to reflector 67 for division into two quaternary beams $w_5$ and $w_6$ received by guides 106 and 107, respectively. It will be noted that, even though adjoining light guides must include obtuse angles with each other, no such limitation exists between feeder guide 102 and the receiving guide 106 at the end of the chain. The maximum number of beam-splitting stages depends, of course, on the initially available luminous energy and on the losses incurred at each stage. With suitable reshaping or reorientation of reflectors 47, 57 and 67, the beam energy received by each light guide 101, 105, 106 and 107 could be made equal, for example, to one fourth of the energy fed in.

The network shown in FIG. 5 is again fully reciprocal in that any of the peripheral light guides 101, 102, 105, 106, 107 may emit a light beam to be suitably distributed among all the other peripheral guides. Conversely, two or more of these peripheral guides may contribute luminous energy to a composite beam carrying, for example, message signals from different sources modulated upon respective carrier frequencies.

The principles disclosed hereinabove may also be used in branched networks that are not fully reciprocal, i.e. in which not every light guide can communicate with every other light guide. Thus, for example, the body 7' of FIG. 6 may be provided with additional reflecting surfaces of ellipsoidal curvature meeting the illustrated surfaces 4' and 6' at a common junction confronting the guide 1 for intercepting some of the rays deviating from the axial plane of guides 1-3 in order to direct them onto further guides not shown. Moreover, the reflector 37 of FIG. 4 may be designed as a six-sided solid body other than a cube as long as its ellipsoidal surfaces (or the associated collective lenses, if any) satisfy the requirements of conjugacy discussed above.

I claim:

1. In a branched light-transmission network including four light guides with end faces confronting a common region, each of said light guides having an axis intersecting the axes of the other light guides, the combination therewith of a central body in said region spaced from said end faces and provided with six outer reflecting surfaces each terminating near the axes of an associated pair of said light guides, each of said surfaces being part of a respective optical focusing system with two conjugate points respectively coinciding with the centers of the end faces of the associated pair of light guides whereby light rays originating at one of said centers are reflected toward the other of said centers, each of said light guides having ray paths extending from the center of its end face to three of said reflecting surfaces whereby light rays from any one of said light guides can be directed to every other of said light guides without passing through said body.

2. In a branched light-transmission network including at least three light guides with end faces confronting a common region, each of said light guides having an axis intersecting the axes of the other light guides, the combination therewith of a central body in said region spaced from said end faces and provided with a plurality of outer reflecting surfaces each terminating near the axis of an associated pair of said light guides, each of said surfaces intersecting the common axial plane of the associated pair of light guides along an arc of an ellipse having foci coinciding with the centers of the end faces of said pair whereby light rays originating at one of said centers are reflected toward the other of said centers, each of said light guides having ray paths extending from the center of its end face to at least two of said reflecting surfaces whereby light rays from any one of said light guides can be directed to at least two other of said light guides without passing through said body.

3. The combination defined in claim 1 or 2, further comprising a mass of transparent material enveloping said body and adjacent extremities of said light guides, said mass having a refractive index substantially matching that of said light guides.

4. The combination defined in claim 2 wherein said reflecting surfaces are elliptically cylindrical.

5. The combination defined in claim 2 wherein said reflecting surfaces are segments of ellipsoids of revolution.

6. The combination defined in claim 2, 4 or 5 wherein the axis of each of said light guides is substantially in line with a junction of two of said reflecting surfaces.

7. The combination defined in claim 6 wherein the axes of said light guides are coplanar and meet in a common point of intersection, said body forming three equispaced vertices in line with said axes.

8. The combination defined in claim 1 or 2 wherein said body is a cube, the axes of said light guides being aligned with respective diagonals of said cube.

9. The combination defined in claim 2 wherein one of said light guides is connected to a receiver for luminous energy from two other of said light guides, further comprising a light barrier interposed between said two other of said light guides for preventing the illumination of either of them by the other.

10. The combination defined in claim 2 wherein one of said light guides illuminates two other light guides via respective reflecting surfaces of said body, at least one of said other light guides extending toward a second reflecting body for distributing the received luminous energy among a plurality of further light guides of said network.

* * * * *